Sept. 4, 1934.     L. M. PAGET     1,972,692
COUPLER FOR TWIST LINK CHAINS
Filed Feb. 8, 1934
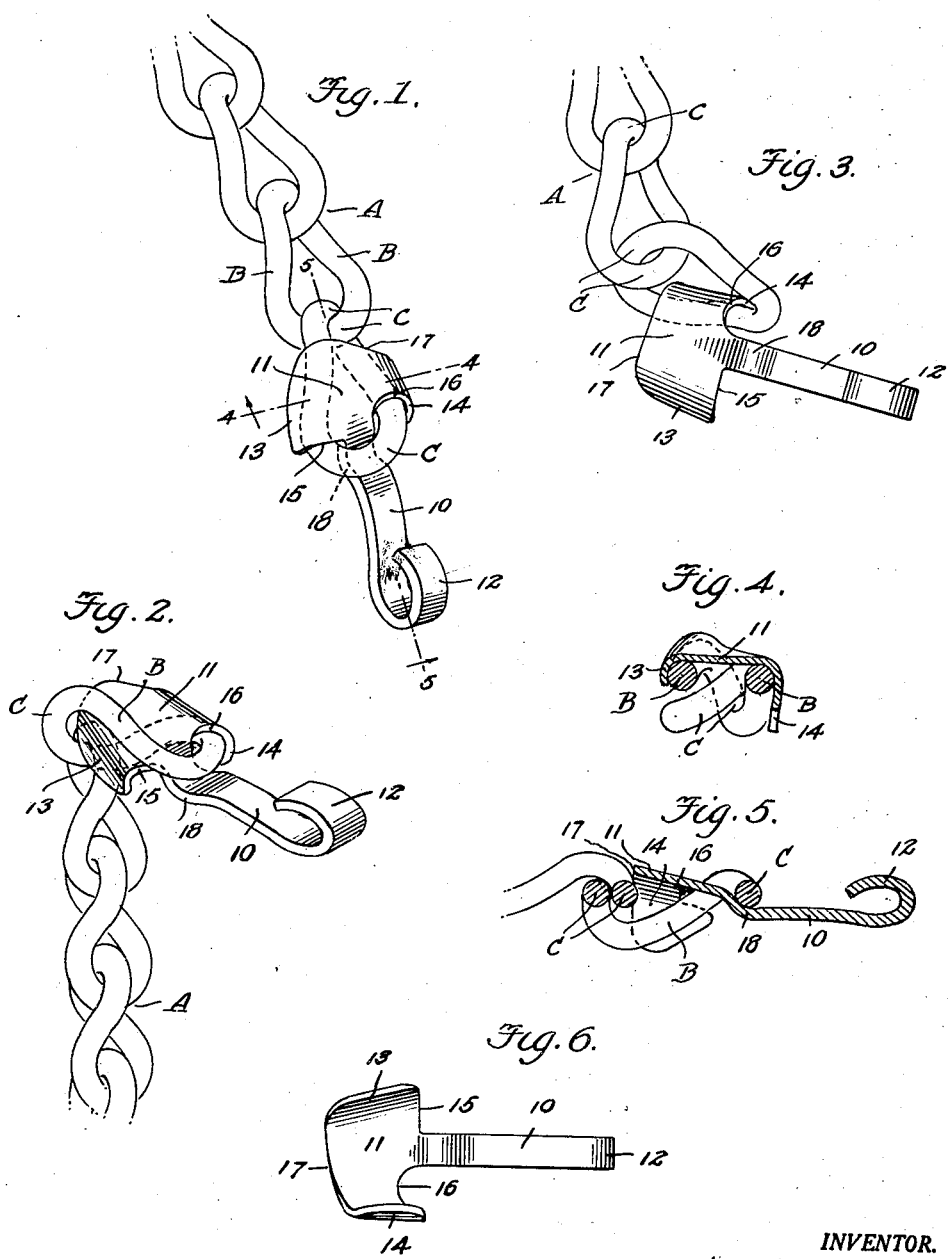
INVENTOR.
LESLIE M. PAGET
BY Clark & Ott
ATTORNEYS.

Patented Sept. 4, 1934

1,972,692

UNITED STATES PATENT OFFICE 1,972,692

COUPLER FOR TWIST LINK CHAINS

Leslie M. Paget, Yonkers, N. Y.

Application February 8, 1934, Serial No. 710,297

6 Claims. (Cl. 24—201)

This invention relates to chain couplers or connectors and while not restricted to such use, the present invention is particularly directed to an improved coupler for detachably connecting the cross elements to the side members of an anti-skid chain structure, especially those in which the cross chains are of twisted link types.

The invention broadly aims to provide a coupler which is so constructed and arranged that the endmost link of a twisted link chain may be engaged therewith and disengaged therefrom without the aid of a tool or implement, while effectually precluding the accidental or unintentional release thereof when so engaged.

As applied to anti-skid chains, the invention provides an easy and effective means for replacing broken cross chains without the use of tools, while insuring a lasting connection between the same and the side chains.

The invention further resides in the provision of a chain coupler which is extremely simple in its construction, inexpensive to produce and which is highly efficient for its intended purpose.

With the above recited and other objects in view, reference is now made to the following specification and accompanying drawing in which there is disclosed a preferred form of the invention, while the claims cover variations and modifications which fall within their scope.

In the drawing,

Fig. 1 is a perspective view of a chain engaged with a coupler or connector constructed in accordance with the invention.

Fig. 2 is a perspective view illustrating the intermediate step in the disengagement of the chain from the coupler.

Fig. 3 is a perspective view illustrating the final step in the removal of the chain from the coupler.

Fig. 4 is a transverse sectional view taken approximately on the line 4—4 of Fig. 1.

Fig. 5 is a longitudinal sectional view taken approximately on the line 5—5 of Fig. 1.

Fig. 6 is a bottom plan view of a coupler or connecting device.

Referring to the drawing by characters of reference, A designates a chain of the conventional twist link type, the links of which include the opposite side leads B and opposite end bights C which are disposed in planes substantially at right angles to each other.

The coupling device constituting the present invention and adapted for use in connection with this type of chain, includes a shank 10 and an integral head 11 at one end thereof, the said shank having a loop 12 at the opposite end or any other equivalent means for connecting the same with the object to which the chain is to be attached, such as the side member of an anti-skid chain structure where the chain A constitutes the cross chain thereof. The head 11 is so shaped or contoured as to effectively anchor or connect the end link of the chain A therewith against unintentional or accidental displacement or release, while permitting of the ready intentional uncoupling or disconnection when desired. As shown, the longitudinal sides of the head 11 are curved downwardly to form longitudinally extending concavo convex ears 13 and 14, the former on its inner concave side following substantially the contour of the side lead B of the link throughout the length of the ear which terminates at its juncture with the shank 10 in a substantially straight shoulder 15. The opposite ear 14 at its juncture at the shank 10, is provided with a concave notch 16 which fits around the end link substantially at the juncture of the end bight C with the side lead B, while the outer end 17 of the head is so disposed in spaced relation to the end bight C of the endmost link as to afford a clearance for the end bight of the next adjacent link when the device is in its fully engaged relation to the chain, as clearly shown in Figs. 1 and 5. The shank 10 at its juncture with the head is offset downwardly as at 18 to accommodate the end bight C of the endmost link so that the device lies in substantially the plane of the chain when it is drawn taut.

With the device in the fully connected or coupled relation to the chain, as shown in Fig. 1, the chain is detached therefrom by swinging the endmost link with reference to the remainder of the chain and with reference to the device to substantially the position illustrated in Fig. 2, so as to disengage the ear 13 from the side lead B of the endmost link and thereunder to engage around the end bight C of the next adjacent link, the end link then being swung using the concave notch 16 as a fulcrum. The swinging of the link is continued until, as shown in Fig. 3, the end link of the chain is engaged only by the ear 14 from which it may be readily unhooked. To apply the chain to the device, the operation is reversed.

In use of the device as applied to anti-skid chains, it will be observed that the removal of a broken cross chain and the substitution of a new cross chain may be readily accomplished without the necessity of employing a tool inasmuch as the looped end 12 may remain affixed to the side member of the anti-skid chain structure. It is also apparent that the device may be formed with identical heads 11 at its opposite ends to serve as a means for coupling together two chains A of the twisted link type.

What is claimed is:

1. A coupler for a twist link chain including a shank and a head connected with the shank by an offset portion of the shank, said offset portion being engageable with the outer bight of the end link, to dispose the head and shank on opposite sides of the link, said head being of a length to extend from the end bight of said link to the end bight of the next adjacent link and said head having outwardly extending side portions provided with upwardly and downwardly inclined bottom faces respectively adapted to closely engage with the opposite side leads of the end link.

2. A coupler for a twist link chain including a head connected with the shank by an offset portion of the shank, said offset portion being engageable with the outer bight of the end link to dispose the head and shank on opposite sides of the link, said head being of a length to extend from the outer bight of said link to the end bight of the next adjacent link and said head having outwardly extending side portions provided with depending marginal ears, the bottom faces of said outwardly extending side portions being upwardly and downwardly inclined so as to closely engage with the opposite side leads of the end link.

3. A coupler for a twist link chain including a shank and a head connected with the shank by an offset portion of the shank, said offset portion being engageable with the outer bight of the end link to dispose the head and shank on opposite sides of the link, said head being of a length to extend between the said outer bight of the end link and the end bight of the next adjacent link, and said head having outwardly extending upwardly and downwardly inclined side portions respectively, which terminate in downwardly curved ears at the side edges thereof and which side portions and ears are adapted to closely engage with the opposite side leads of the end link respectively.

4. A coupler for a twist link chain comprising a shank adapted to engage under the outer bight of the end link of the chain and a channeled head adapted to engage over the side leads of said end link, said head being axially and transversely twisted to conform to the twist of the link.

5. A coupler for a twist link chain comprising a shank adapted to engage under the outer bight of the end link of the chain and a channeled head adapted to engage over the side leads of said end link, said head being axially and transversely twisted to conform to the twist of the link, and said head having a notched rear edge at one side of the shank to initially receive the end bight of the end link so as to permit of engagement and disengagement of the end link therewith by shifting of said end link to a predetermined relative position with reference to the bight of the next adjacent link.

6. A coupler for a twist link chain comprising a strap like head of a breadth to bridge the side leads of the end link of the chain and of a length to extend from the end bight of said end link to the end bight of the next adjacent link, down curved ears at the side edges of the end link and a shank having an offset portion at its juncture with the head to underlie and partially embrace the end bight of the end link.

LESLIE M. PAGET.